United States Patent [19]

Jonas

[11] Patent Number: 4,971,824
[45] Date of Patent: Nov. 20, 1990

[54] FROZEN NATURAL FOOD PRODUCT

[75] Inventor: Rodger H. Jonas, Cincinnati, Ohio

[73] Assignee: Chiquita Brands, Inc., Cincinnati, Ohio

[21] Appl. No.: 391,418

[22] Filed: Aug. 9, 1989

[51] Int. Cl.$^5$ ............................................. A23G 9/00
[52] U.S. Cl. .................................. 426/565; 426/599; 426/569
[58] Field of Search ............... 426/565, 566, 567, 101, 426/599, 100, 249

[56] References Cited

U.S. PATENT DOCUMENTS

| | | | |
|---|---|---|---|
| 2,977,231 | 3/1961 | Fox | 426/591 |
| 3,119,699 | 1/1964 | Gunther | 426/656 |
| 3,159,492 | 12/1964 | Rubenstein | 426/588 |
| 3,182,611 | 5/1965 | Rubenstein | 426/101 |
| 3,343,967 | 9/1967 | Rubenstein | 426/565 |
| 3,470,706 | 10/1969 | Mitchell | 426/565 |
| 3,492,126 | 1/1970 | Rubenstein | 426/565 |
| 3,503,757 | 3/1970 | Rubenstein | 426/565 |
| 3,508,926 | 4/1970 | Werbin | 426/453 |
| 3,525,624 | 8/1970 | Rubenstein | 426/565 |
| 3,526,515 | 9/1970 | Werbin | 426/101 |
| 3,543,695 | 12/1970 | Rubenstein | 426/565 |
| 3,582,350 | 6/1971 | Werbin | 426/568 |
| 3,922,361 | 11/1975 | Vann | 426/387 |
| 3,949,098 | 4/1976 | Bangert | 426/599 |
| 4,189,502 | 2/1980 | Rubenstein | 426/599 |
| 4,291,810 | 9/1981 | Rubenstein | 211/89 |
| 4,293,580 | 10/1981 | Rubenstein | 426/565 |
| 4,390,553 | 6/1983 | Rubenstein | 426/138 |
| 4,505,220 | 3/1985 | Bank | 118/16 |
| 4,551,341 | 11/1985 | Blanie | 426/489 |
| 4,603,051 | 7/1986 | Rubenstein | 426/138 |
| 4,609,561 | 9/1986 | Wade et al. | 426/599 |
| 4,737,367 | 4/1988 | Langer et al. | 426/599 |
| 4,828,866 | 5/1989 | Wade et al. | 426/599 |
| 4,874,617 | 10/1989 | Sole | 426/599 |

OTHER PUBLICATIONS

"Frozen Fruit Juice Has Ice Cream Texture", *Food Engineering*, Jun. 1977.
"Fruit Juices with Reduced Color and Flavor Can Replace Sugar in Many Foods", Prepared Foods, Mar., 1985.
"Ingredients Play Natural Role," Palmer, *Focus on Premium Products*.
Affidavit of Irving H. Rubenstein From the Reexamination File History of Wade, U. S. Bl 4,609,561.
Staley Protein Division "Gunther's D-100 Whipping Protein in Orange Ice, 25% Total Solids".
"Frosty Fruit Whipped Orange Juice Dessert".
"Sweetheart Brand Procust", Cost Sheet.
"Sweetheart Freeze'n Fruit-Apple-Strawberry" Cost Sheet.
"Sweetheart Appleberry Freeze'n Fruit".
"Sweetheart Apple-Cranberry Freeze'n Fruit".
"Sweetheart Freeze'n Apple-Cranberry" Cost Sheet.

*Primary Examiner*—Jeanette Hunter
*Attorney, Agent, or Firm*—Fish & Richardson

[57] ABSTRACT

An all natural, frozen food product and method for making same. The product is formed solely from all natural fruit, vegetable juices, purees or combination thereof. No additional vegetable proteins or stabilizers are required, yet a consistency ranging from a slush drink to hard pack ice cream is obtained by interaction of natural ingredients mixed in proper proportions. In particular, the product has a brix level from about 16 to 35, a pH of less than about 4.5, and is produced to have an overrun of between about 18 and 100. In some embodiments, food (fruit or vegatable) chunks are included which maintain their fruit piece identity. Processing includes heating a base mixture of purees and/or juices. Preferably the base mixture is aseptically processed to produce a shelf stable product. The consistency can be selected based on the brix and pH characteristics of the base.

16 Claims, No Drawings

FROZEN NATURAL FOOD PRODUCT

FIELD OF THE INVENTION

This invention relates to all natural frozen food products and more particularly to frozen fruit and vegetable products having all natural ingredients and desired consistency.

It is known to provide frozen fruit and fruit juice food products with an adjusted consistency by including stabilizers, such as guar gum and carrageenan. The texture is typically adjusted by the addition of vegetable proteins such as soy concentrate or malic acid. For an aesthetics, it is common to further add artificial colors and flavors.

Not only do such additions increase expense and complexity during processing, but some additives have been linked to a variety of health problems, e.g., carrageena has been associated with hypersensitivity.

SUMMARY OF THE INVENTION

The invention features an all natural, frozen food product having a processed base formed of natural, juice or puree or combination thereof. The product has a brix level from about 6 to 35, a pH of less than about 4.5, an overrun from about 18 to 100, and is substantially free of added vegetable protein and stabilizers.

The product may be substantially free of any additive and consist substantially of ingredients selected from fruit, vegetable, and juices and purees.

Gum may be used as a thickener.

The product may have a slush-drink consistency and the overrun may be between about 18 to 75. The product may have a soft-serve ice cream consistency and an overrun from about 18 to 70. The product may have a hard ice cream consistency and an overrun up to about 100. The pH may be about 4.2 and the brix about 20 to 28. The base may include banana puree.

Another feature of the invention is a method for producing an all natural, frozen food product formed substantially of fruit juice or puree or combination thereof, which includes no additional stabilizer or protein. The method includes preparing a base by mixing juices, purees or combinations thereof, adjusting the pH of the base to less than about 4.5, and adjusting the brix level of the base to between about 6 and 35. The base is heated to boiling, and cooled. The base is processed to form a frozen product having an overrun of between about 18 and 100. The base may be processed to have an overrun from between about 18 and 25 and the product may have the consistency of a slush drink. The base may be processed to have an overrun from between about 18 and 70 and the product may have the consistency of a soft serve ice cream. The base may be processed to have an overrun up to about 100 and the product may have the consistency of a hard pack ice cream. Fruit pieces which maintain their identity in the final product may be added to said base, during processing. The heating may include boiling the base. The heating may include aseptically processing the base.

The adjusting may include selecting juice and//or purees for increasing or decreasing the brix, pH or pectin level. The adjusting may include selecting the amount of water in the base for adjusting the brix pH or pectin.

It is an objective of the present invention to provide a food product consisting of an all natural fruit and/or vegetable base, having desired consistency without the addition of stabilizers, vegetable proteins or non-natural additives.

In preferred embodiments, the frozen dessert product may be used in dispensing machines such as soft serve or slush machines. Critical mix parameters have been found which allow a desired consistency of the final product to be maintained without the addition of stabilizers or vegetable proteins.

These and other features and advantages will be seen from the following description of presently preferred embodiments, and from the claims.

DESCRIPTION OF PREFERRED EMBODIMENTS

The present invention provides an all fruit food product formed by mixing and processing a natural fruit base consisting solely of fruit and//or vegetable juices, purees, concentrates and the like. The product requires no additional stabilizers or vegetable proteins, yet a consistency ranging from a frozen, slush-type drink to a hard ice cream is obtained by the interaction of the natural ingredients mixed in proper proportions. The consistency can be selected prior to processing based on the characteristic brix and pH of the base.

In the method of producing the product, the components are mixed and then heated to form a base. The base may then be directly processed in a slush, soft serve or hard pack ice cream apparatus. The interaction of the components produces, upon cooling and processing, an all natural food of desirable consistency. In some embodiments, the method includes aseptically processing the base for forming a more stable product.

The product described herein, by virtue of the all fruit ingredients and its being without additives, is a dessert or snack food that is appetizing, typically with high fiber, and having no added fat, and no cholesterol. Furthermore, the lack of additives streamlines processing and reduces expense.

The all natural food product includes a processed base formed of a natural juice or puree or a combination of these. The mixture has selected levels of sugar derived from fruit juice (brix), acid (pH), water, and pectin to produce desired consistency after processing. The mixture is heated to a boil, poured, then cooled and packaged.

We have discovered that a product from a base having a brix level from about 16 to 35 and a pH less than about 4.5 provides a product, after processing, which may have an overrun between 18 and 100 and a viscosity between that of a slush-drink and a hard ice cream without the addition of vegetable protein and stabilizers. The pH and brix level of the final product remain substantially the same after processing. By controlling the pH and brix in the base, the setting characteristics and viscosity of the final product are controlled.

The pH must be adjusted within the appropriate range. A pH which is too high results in an unset food which remains liquid after processing. A pH which is too low results in a product which can separate. The pH of the base can be raised (made less acidic) by, for example, dilution with water or a low acidic (higher pH) juice such as apple juice, peach juice or pear juice. To increase the acidity, juice of high acidic content can be employed, for example, juices of the citrus fruit (oranges, lemons, limes, grapefruits, pineapple), acidic berries (raspberries and strawberries), or the like. The water in the base might also be reduced by heating.

The brix level, which measures the sweetness and in part is a measure of the thickness of the mix, can be increased by addition of sweet juices or purees, for example, apple, pineapple or grape juice or puree. The brix level can be lowered by the addition of more acidic, less sweet juices or purees as discussed above with respect to pH adjustment. Similarly, the water content might be increased or decreased to have a like affect on the brix level. The pH and the brix level change only marginally and predictably during the heat processing.

The overrun may be adjusted, as known, by adjustable operation of commercial ice cream or slush making machine. Such devices whip a base mixture to include air while freezing the product. Any suitable soft serve ice cream, yogurt, or hard ice cream machines may be used.

For a slush-drink type product, an overrun of about 18 to 25 is typically selected. For soft-serve type ice cream product, an overrun of about 18 to 70 is preferred. A hard-pack ice cream might use an overrun as high as 100. For slush and soft serve, the products do not generally include food pieces which maintain their fruit piece identity since such particles cannot be processed in conventional ice cream making equipment. A hard pack ice cream, on the other hand, may include fruit pieces.

For forming a hard pack, the base, after mixing and heating, is placed in suitable ice cream machine and processed. The product may then be placed in a hardening room.

The fruit products described herein provide a creamy type frozen dessert without the disadvantageous ingredients of a milk product based food. For example, the dessert of the instant invention is very low fat, has no milk, milk solids, lactose, cholesterol, added sugars, or artificial flavors. Furthermore, the products can be made high in fiber by proper incorporation of high fiber fruits or vegetables, for example, apples.

The invention will be further described by way of the following examples.

EXAMPLE 1

The following ingredients were mixed in a proper mixing vessel to produce a pineapple flavored frozen dessert according to the invention.

| Ingredient | % | Weight In Pounds | Gallons |
| --- | --- | --- | --- |
| Banana Puree | 0.89 | 25.00 | 3.5 |
| Pineapple Juice Concentrate | 17.38 | 487.00 | 45.4 |
| White Grape Juice Concentrate XB30 | 23.16 | 649.00 | 58.3 |
| Pineapple Flavor (natural) | 0.68 | 19.00 | 2.24 |
| Water | 57.89 | 1,622.00 | 195.0 |
| TOTAL | 100.00 | 2,802.00 | 304.44 |

The ingredients were mixed and heated to boiling for 3 minutes, poured into a container at room temperature, and allowed to cool. The base was asceptically processed at 194° for 15 seconds. The base may then be introduced into an ice cream or slush making machine and the overrun selected. The base had a pH of approximately 3.4 and a brix level of about 30.

EXAMPLE 2

A strawberry flavored fruit product was obtained by mixing the following ingredients and processing as in Example 1.

| Ingredient | % | Weight In Pounds | Gallons |
| --- | --- | --- | --- |
| Chiquita ® Banana Puree | .96 | 27.00 | 3.72 |
| Red Grape Juice Concentrate XB1000 (Natural) | 1.64 | 46.00 | 4.13 |
| Strawberry Flavor | 0.54 | 15.00 | 1.76 |
| White Grape Juice Concentrate XB30 | 38.76 | 1,086.00 | 97.6 |
| Water | 58.10 | 1,628.00 | 195.7 |
| TOTAL | 100.00 | 2,802.00 | 302.91 |

The base and product had a pH level of 3.4 and a brix level of 30.

EXAMPLE 3

A raspberry flavored fruit product was obtained by mixing of the following ingredients and processing as in Example 1.

| Ingredient | % | Weight In Pounds | Gallons |
| --- | --- | --- | --- |
| Banana Puree | 0.68 | 19.00 | 2.6 |
| Red Grape Juice Concentrate XB1000 | 4.50 | 126.00 | 11.3 |
| White Grape Juice Concentrate XB30 | 31.44 | 881.00 | 79.2 |
| Mixed Fruit Juice Concentrate Type II | 3.00 | 84.00 | 7.5 |
| Water | 59.71 | 1,673.00 | 201.1 |
| Raspberry Flavor | 0.46 | 13.00 | 1.6 |
| Cherry-Apple Flavor | 0.21 | 6.00 | 0.72 |
| TOTAL | 100.00 | 2,802.00 | 304.02 |

The base and product has a pH level of 3.3 and a brix level of 27.

EXAMPLE 4

A banana flavored fruit product was obtained by mixing the following ingredients and the processing as in Example 1.

| Ingredient | % | Weight In Pounds | Gallons |
| --- | --- | --- | --- |
| Banana Puree | 4.05 | 114.00 | 15.7 |
| White Grape Juice Concentrate XB30 | 13.84 | 390.00 | 35.0 |
| Water | 49.33 | 1,391.00 | 167.0 |
| Banana Flavor | 0.46 | 13.00 | 1.72 |
| Apple Juice Concentrate | 32.32 | 911.00 | 80 |
| TOTAL | 100.00 | 2,819.00 | 299.42 |

The base and product has a pH level of 3.4 and a brix level of 30.

EXAMPLE 5

A pear-banana flavored fruit product was obtained by mixing of the following ingredients and processing as in Example 1.

| Ingredient | Amount (in Grams) |
| --- | --- |
| Banana Puree | 394 |
| Orange-Banana Juice | 1978 |
| Apple Juice Concentrate | 1884 |
| Pear Puree Concentrate | 2920 |
| Pineapple Puree | 788 |
| Water | 4423 |
| Kiwi Peach Flavor (optional) | 30 |

The base and product has a pH level of 3.9 and a brix level of 24.

EXAMPLE 6

A strawberry-banana flavored fruit product was obtained by mixing of the following ingredients and processing as in Example 1.

| Ingredient | Amount (in Grams) |
| --- | --- |
| Type I Banana Puree | 279 |
| Orange Banana Juice | 560 |
| Apple Juice Concentrate | 1860 |
| Pineapple Puree | 1399 |
| Strawberry Puree | 2799 |
| Water | 1000 |
| Pear Juice | 200 |

The base and product has a pH level of 3.9 and a brix level of 24.8.

EXAMPLE 7

A strawberry-banana flavored fruit product was obtained by mixing of the following ingredients and processing as in Example 1.

| Ingredient | Amount (in Grams) |
| --- | --- |
| Type II Pear Banana Formula (Example 5) | 12,417 |
| Strawberry Puree | 2,200 |

The base and product has a pH level of 3.89 and a brix level of 21.0.

Many modifications and variations of the present invention are possible when considered in light of the above examples. It will be appreciated, for example, that other mixtures can be obtained by following the teachings herein. For example, gum may also be added to the base as a thickener. It is therefore understood that the scope of the present invention is not to be limited to the details disclosed herein and may be practiced otherwise than as specifically described.

What is claimed is:

1. An all natural frozen food product comprising a processed base formed of natural juice, puree or combination thereof, said product having brix level from about 16 to 35, pH of less than about 4.5, overrun from about 18 to 100, and being free of added vegetable protein and stabilizers.

2. The product of claim 1 further being substantially free of any additives and consisting substantially of ingredients selected from fruit, vegetable, and juices and purees formed therefrom.

3. The product of claim 1 wherein said product is a slush-drink consistency and overrun is between about 18 to 75.

4. The product of claim 1 wherein said product has a soft-serve ice cream consistency and overrun from about 18 to 70.

5. The product of claim 1 wherein said product has a hard ice cream consisting and overrun up to about 100.

6. The product of any of the above claims wherein the pH is about 4.2 and brix is about 20 to 28.

7. The product of claim 1 wherein said base includes banana puree.

8. A method for producing an all natural frozen food product formed of natural juice, puree or combination thereof, and free of added stabilizer or protein, said method comprising:
preparing a base by mixing juices, purees or combinations thereof,
adjusting the pH of said base to less than about 4.5,
adjusting the brix level of said base to between about 16 and 35,
heating said base to boiling,
cooling said base, and
processing said base to form a frozen product having overrun of between about 18 and 100.

9. The method of claim 8 wherein said base is processed to have overrun from between about 18 and 25 and said product has the consistency of a slush drink.

10. The method of claim 8 wherein said base is processed to have overrun from between about 18 and 70 and said product has the consistency of a soft serve ice cream.

11. The method of claim 8 wherein said base is processed to have overrun up to about 100 and said product has the consistency of a hard pack ice cream.

12. The method of claim 8 further including adding to said base, during processing, fruit pieces which maintain their identify in the product.

13. The method of claim 8 wherein said heating includes boiling said base.

14. The method of claim 8 wherein said heating includes aseptically processing said base.

15. The method of claim 8 wherein said adjusting includes selecting an amount of juice and/or purees for increasing or decreasing said brix, pH or the natural pectin level of said base.

16. The method of claim 8 wherein said adjusting includes selecting an amount of water in said base for adjusting said brix, pH or the natural pectin level of said base.

* * * * *